(12) United States Patent
Stoianovici et al.

(10) Patent No.: US 12,007,009 B2
(45) Date of Patent: Jun. 11, 2024

(54) HARMONIC DRIVE ACTUATOR GEARHEAD

(71) Applicant: THE JOHNS HOPKINS UNIVERSITY, Baltimore, MD (US)

(72) Inventors: Dan Stoianovici, Reisterstown, MD (US); Doru Petrisor, Lutherville, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 17/773,829

(22) PCT Filed: Nov. 2, 2020

(86) PCT No.: PCT/US2020/058545
§ 371 (c)(1),
(2) Date: May 2, 2022

(87) PCT Pub. No.: WO2021/087457
PCT Pub. Date: May 6, 2021

(65) Prior Publication Data
US 2022/0373073 A1    Nov. 24, 2022

Related U.S. Application Data

(60) Provisional application No. 62/928,710, filed on Oct. 31, 2019.

(51) Int. Cl.
*F16H 49/00*    (2006.01)
*H02K 7/116*    (2006.01)

(52) U.S. Cl.
CPC .......... *F16H 49/001* (2013.01); *H02K 7/116* (2013.01)

(58) Field of Classification Search
CPC ........................................ F16H 49/001
USPC ........................................... 74/640
See application file for complete search history.

(56) References Cited

U.S. PATENT DOCUMENTS 3,558,944 A * 1/1971 Verge .................... H02K 41/06
                                                  310/82
3,986,412 A * 10/1976 Farley ................... F16H 49/001
                                                  475/5
4,509,904 A * 4/1985 MacAskill .......... F04B 11/0041
                                                  417/568

(Continued)

FOREIGN PATENT DOCUMENTS

RU    2166141 C1    4/2001
RU    2377456 C1    12/2009
SU    1490350 A1    6/1989

OTHER PUBLICATIONS

Mata-Jimenez, et al., On the control of mechanical systems with dynamic backlash. 1997; vol. 2 pp. 1990-1995.

(Continued)

*Primary Examiner* — Ha Dinh Ho

(57) ABSTRACT

A novel way of mounting a harmonic drive gearhead to a cylindrically shaped motor reduces the overall size of the actuator assembly. Specifically, the motor is mounted within the harmonic drive and its bearings, a space that is typically occupied by a harmonic drive component. This is made possible by redesigning the harmonic drive such that it is able to surround the motor and provide for a compact footprint for the actuator assembly.

20 Claims, 5 Drawing Sheets

(56) References Cited

U.S. PATENT DOCUMENTS

| | | | | |
|---|---|---|---|---|
| 4,833,941 A | * | 5/1989 | Leppanen | G01B 7/02 |
| | | | | 74/625 |
| 5,860,331 A | * | 1/1999 | Hashimoto | F16H 49/001 |
| | | | | 901/21 |
| 6,119,553 A | * | 9/2000 | Yamagishi | F16H 49/001 |
| | | | | 277/410 |
| 7,051,610 B2 | | 5/2006 | Holtz | |

OTHER PUBLICATIONS

Taylor, et al., Medical robotics in computer-integrated surgery. IEEE Transactions on Robotics and Automation. Oct. 2003; vol. 19(5) pp. 765-781.
Chen, et al., Research on gears' dynamic performance influenced by gear backlash based on fractal theory. Applied Surface Science. 2014; vol. 313 pp. 325-332.
Roos, et al., Optimal selection of motor and gearhead in mechatronic applications. Mechatronics. 2006; vol. 16(1) pp. 63-72.
Mata-Jimenez et al., On the control of mechanical systems with dynamic backlash., Proceedings on the 36th Conference on Decision and Control., (1997), pp. 1990-1995.
Taylor et al., Medical robotics in computer-integrated surgery., IEEE Transactions on Robotics and Automation., (2003), pp. 765-781, vol. 19(5).
Chen et al., Research on gears' dynamic performance influenced by gear backlash based on fractal theory., Applied Surface Science., (2014), pp. 325-332, vol. 313.
Roos et al., Optimal selection of motor and gearhead in mechatronic applications., Mechatronics., (2006), pp. 63-72, vol. 16(1).

* cited by examiner

HARMONIC DRIVE ACTUATOR GEARHEAD

CROSS REFERENCE TO RELATED APPLICATIONS

This application is a 35 U.S.C. § 371 U.S. national entry of International Application PCT/US2020/058545, having an international filing date of Nov. 2, 2020, which claims the benefit of U.S. Provisional Application No. 62/928,710, filed Oct. 31, 2019, the content of each of the aforementioned applications is herein incorporated by reference in their entirety.

FIELD OF THE INVENTION

The present invention relates generally to motors. More particularly, the present invention relates to a harmonic drive actuator gearhead.

BACKGROUND OF THE INVENTION

Precision of computer controlled motion requires low backlash mechanical transmissions in the kinematic chains that link the motors to the driven elements/end-effectors. If backlash (mechanical slack, play) is present, the driven element does not exactly follow the motion of the motor contributing to kinematic errors and possible dynamic effects. Mechanical backlash impacts the kinematic performance of robots, including medical robots. However, most mechanical transmissions are based on gears, and with gears the backlash is difficult to control. Few mechanical transmissions have minimal backlash or backlash-free, including ball-screws, ball-worms, cables, and harmonic drives.

Gearheads are mechanical transmissions that are attached to motors in a common actuator assembly, typically to reduce speed and increase torque through a transmission ratio. The motor and gearhead are commonly attached end-to-end, so that the overall length sums the length of the components. The increased size limits their applicability.

Therefore, it would be advantageous to provide a harmonic drive actuator gearhead.

SUMMARY OF THE INVENTION

The foregoing needs are met, to a great extent, by the present invention, wherein in one aspect a device assembly includes a motor and a gearhead actuator assembly. The gearhead is configured for the motor to sit in a space defined within the gearhead actuator assembly.

In accordance with an aspect of the present invention, the device includes a bell-shaped harmonic drive wave generator. The device can include a bell-shaped motor mount. The motor is cylindrically shaped. The motor is an electrical motor. Bearings are located laterally to allow their dual use for the harmonic drive as well as main bearings of the device. The motor comprises a gearhead. The device includes a harmonic drive with static and dynamic circular splines. The device includes a flexible spline and an output shaft.

In accordance with another aspect of the present invention, a harmonic gearhead assembly includes a motor. The harmonic gearhead assembly includes a static component and an output component. The output component is operatively coupled to the motor, such that the action of the motor generates a corresponding action of the output component. The static component and the output component are arranged to define a space in which the motor is disposed.

In accordance with yet another aspect of the present invention, the harmonic gearhead assembly further includes a bell-shaped harmonic drive wave generator. The harmonic gearhead assembly includes a bell-shaped motor mount. The motor is cylindrically shaped. The motor is an electrical motor. Bearings are located laterally to allow their dual use for the harmonic drive as well as main bearings of the device. The motor includes a gearhead. The harmonic gearhead assembly can also include a harmonic drive with static and dynamic circular splines. The static circular splines are coupled to the static component and the dynamic circular splines are coupled to the output component. The harmonic gearhead assembly can includes a flexible spline. The motor is mounted from a head end of the motor.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and.

DETAILED DESCRIPTION

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

The present invention is directed to a novel way of mounting a harmonic drive gearhead to a cylindrically shaped motor that reduces the overall size of the actuator assembly. Specifically, the motor is mounted within the harmonic drive and its bearings, a space that is typically occupied by a harmonic drive component. This is made possible by redesigning the harmonic drive such that it is able to surround the motor and provide for a compact footprint for the actuator assembly.

Indeed, according to the present invention, the overall size of the actuator assembly is comparable to that of the harmonic drive and bearings alone. Moreover, the arrangement allows the bearings to bear payload, so that actuator can be used as a joint, directly with no need for additional bearings. For using a harmonic drive, the actuator also inherits its backlash-free high transmission ratio performance. Encoders are typically included with the motor. Motors are typically electrical, but other cylindrically shaped motors can also be used. The present invention includes a compact backlash-free actuator directly applicable to robotic rotary joints.

Harmonic drives have been previously used as motor gearheads. The approach however, was to connect them as typical gearheads, end-to-end, mounting the gearhead at the motor end. For example, in a Redundant Motor Reducer Drive, two motors, two harmonic drives, and their support bearings are mounted in this end-to-end configuration, as illustrated in FIG. 1.

Figure 1:
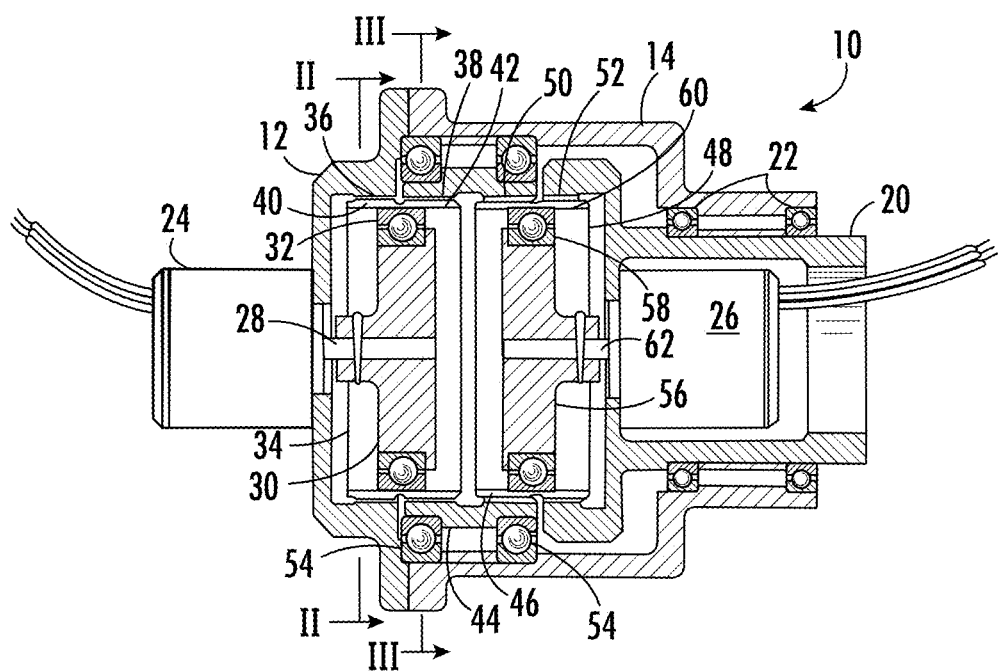
FIG. 1 illustrates a partially sectional view of a redundant motor reducer drive.

FIG. 1 illustrates a partially sectional view of a redundant motor reducer drive. With respect to FIG. 1, the motors 24 and 26 are attached to the side of harmonic drive components 30 and 56, respectively. Bearings 54 are then placed over the harmonic drives, making the overall assembly larger in both the length and diameter. Indeed, this design includes two motors, however, the size increase is observable on either side. On the left side, for example, the central part of the harmonic drive is occupied by component 30. As such, to shorten the length, the motor 24 could not be placed within the harmonic drive component 32, and was placed on the side. To reduce the overall size of harmonic drive gearhead—motor assemblies for precision joint actuators—space at the center of the harmonic drive can be gained by redesigning its central components to accommodate the motor within.

The design of the new gearhead of the present invention is shown in FIGS. 2A-2E. FIGS. 2A-2D illustrate views of a harmonic gearhead, according to an embodiment of the present invention. The harmonic gearhead 100 includes a motor 106 and a gearhead actuator assembly having a static component 102 and an output component 104. As shown, the motor 106 is placed centrally, within an opening defined by the static component 102 and the output component 104, shortening the overall assembly. The base of the gearhead actuator assembly is the static component 102 and the output is the output component 104. The motor 106 is mounted at its head on a bell shaped, thin tubular flange, or motor mount, 108 that attaches to the static component 102 with screws 110. Virtually, this flange shifts the mounting place of the motor from head to tail, allowing to support it from the back while placing it within the other components. A harmonic drive with static and dynamic circular splines 122, 130 is used. The central part of harmonic drives is normally occupied by the wave generator shaft 112, which is also its input. To claim this space for use of the motor, the wave generator shaft 112 was designed also with a thin tubular shape over the motor, a bell shape structure. On one side, the shaft 112 is connected to the motor 106 and output component 104. At the other side it presents a deformable, oval-shaped, wave generator shaft 114. The bearing 116 presents thin elastic races to deform to the oval shape of 114, propagates the waves as usual. In turn, the oval bearing 116 deforms the dynamic, flexible spline 118. Teeth 120 of the dynamic, flexible spline 118 engage teeth 124 of the static circular spine 122. Similarly, teeth 129 of the dynamic, flexible spline 118 also engage teeth 132 of the dynamic, circular spine 130. When the motor spins, a difference between the number of teeth of these gears causes the dynamic, circular spine 130 to slowly rotate relative to the static one 118.

Figure 2A:
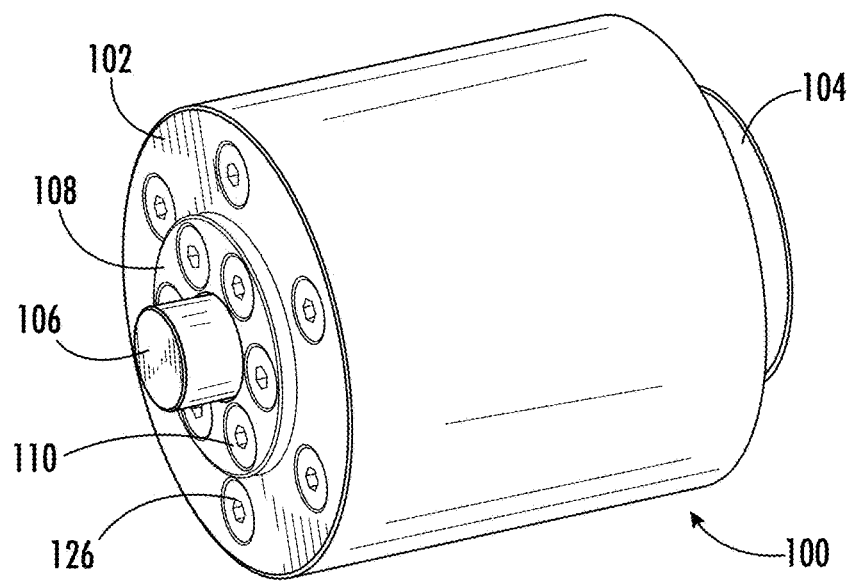
FIGS. 2A-2E illustrate views of a harmonic gearhead, according to an embodiment of the present invention.
Figure 2B:
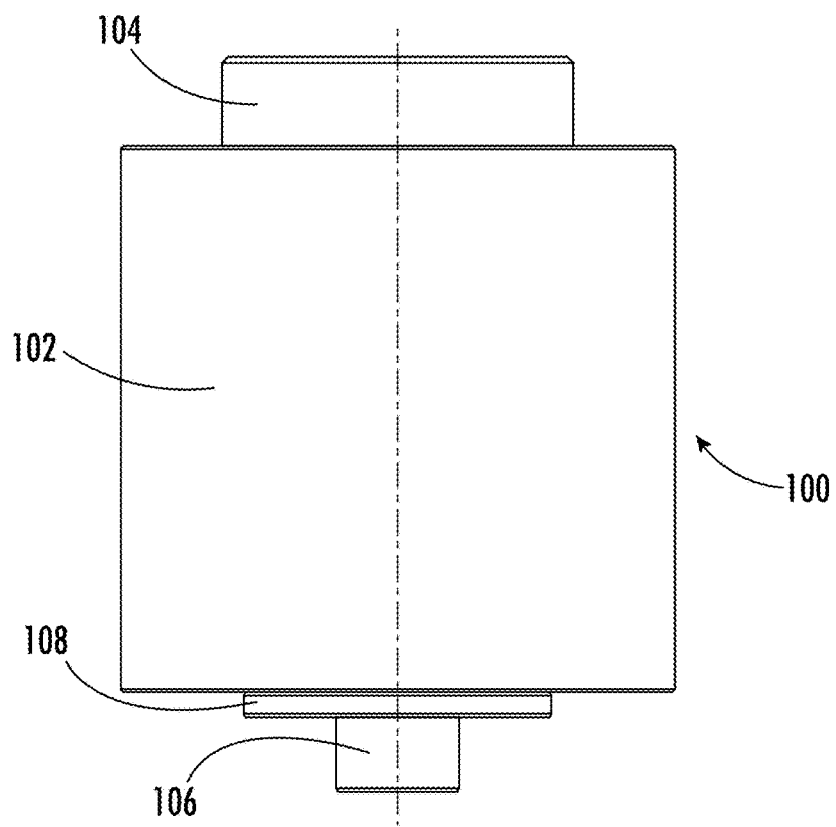
Figure 2C:
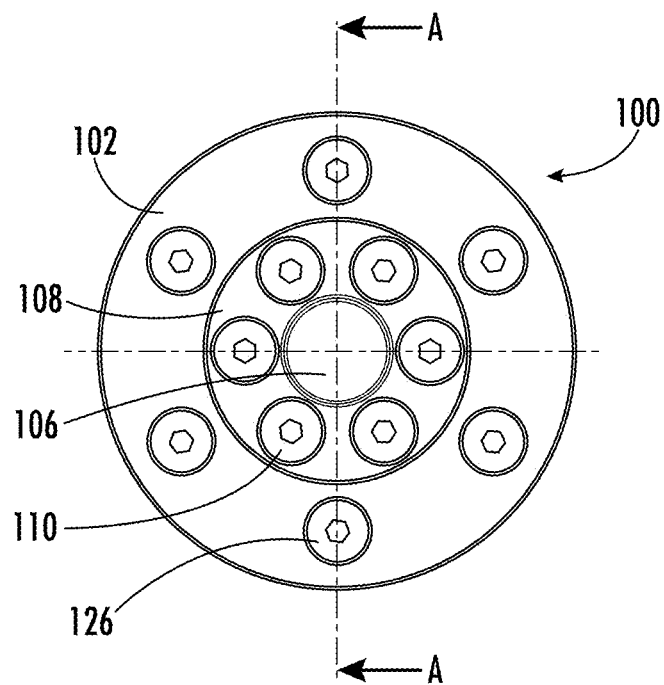
Figure 2D:
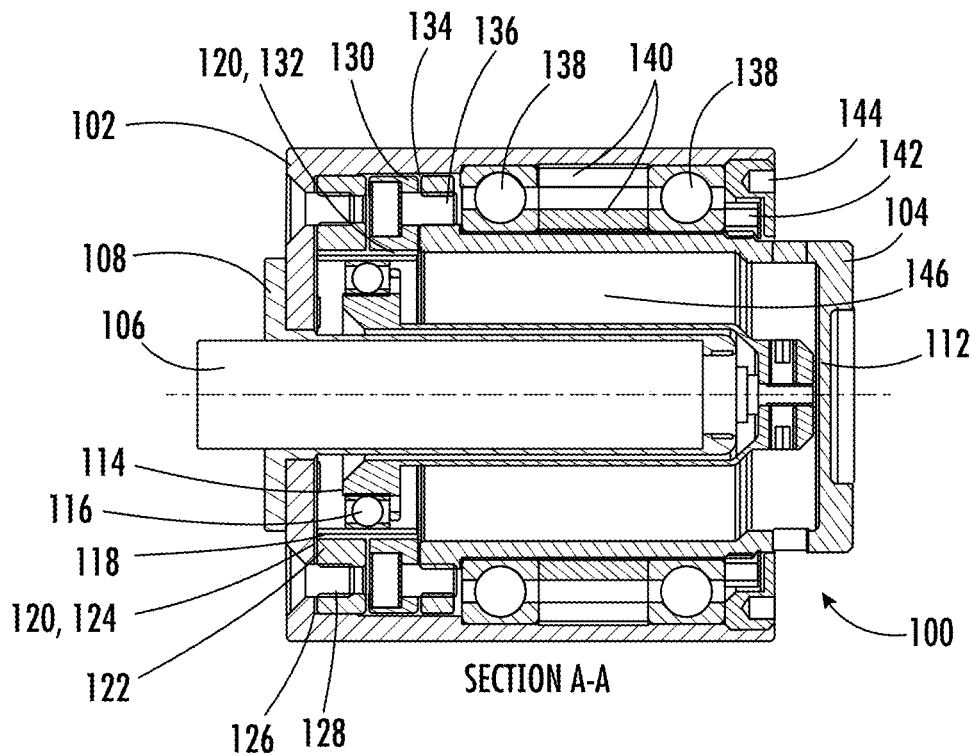

With respect to FIG. 2D, the static spline 122 is mounted on the static component 102 with screws 110. The dynamic spline 130 is mounted on the output component 104 with screws 136. Therefore, motor 106 rotation causes the output component 104 to rotate relative to the static component 102, with a backlash-free, high transmission ratio. Tow bearings 138, spacers 140, and ring nuts 142, 144 are used to support the shaft 2 within the static component 102. As shown, these are placed lateral of the harmonic drive and are sized similar to the circular spines 122 and 130 not to increase the diameter of the assembly, but use axial space that is available from the motor. The assembly could potentially be made smaller in diameter if needed by lowering the bearings closer to the motor, within the space 146 that is available. However, this also reduces the diameter of the output shaft, reducing its structural stiffness. It should also be noted that static component 102 can be a single-piece or a multi-piece design. The output component 104 can also be a single-piece or a multi-piece design. This is determined, at least in part, by manufacturing needs and by the intended use of the particular harmonic gearhead 100.

The motor 106 may also include a gearhead if a transmission ratio higher than that of the harmonic drive is needed. Moreover, the motor 106 may also include encoders, as needed for the motion control and safety Depending on the application, the motor 106 may be a common gearhead-motor-encoder assembly on its own.

Figure 2E:
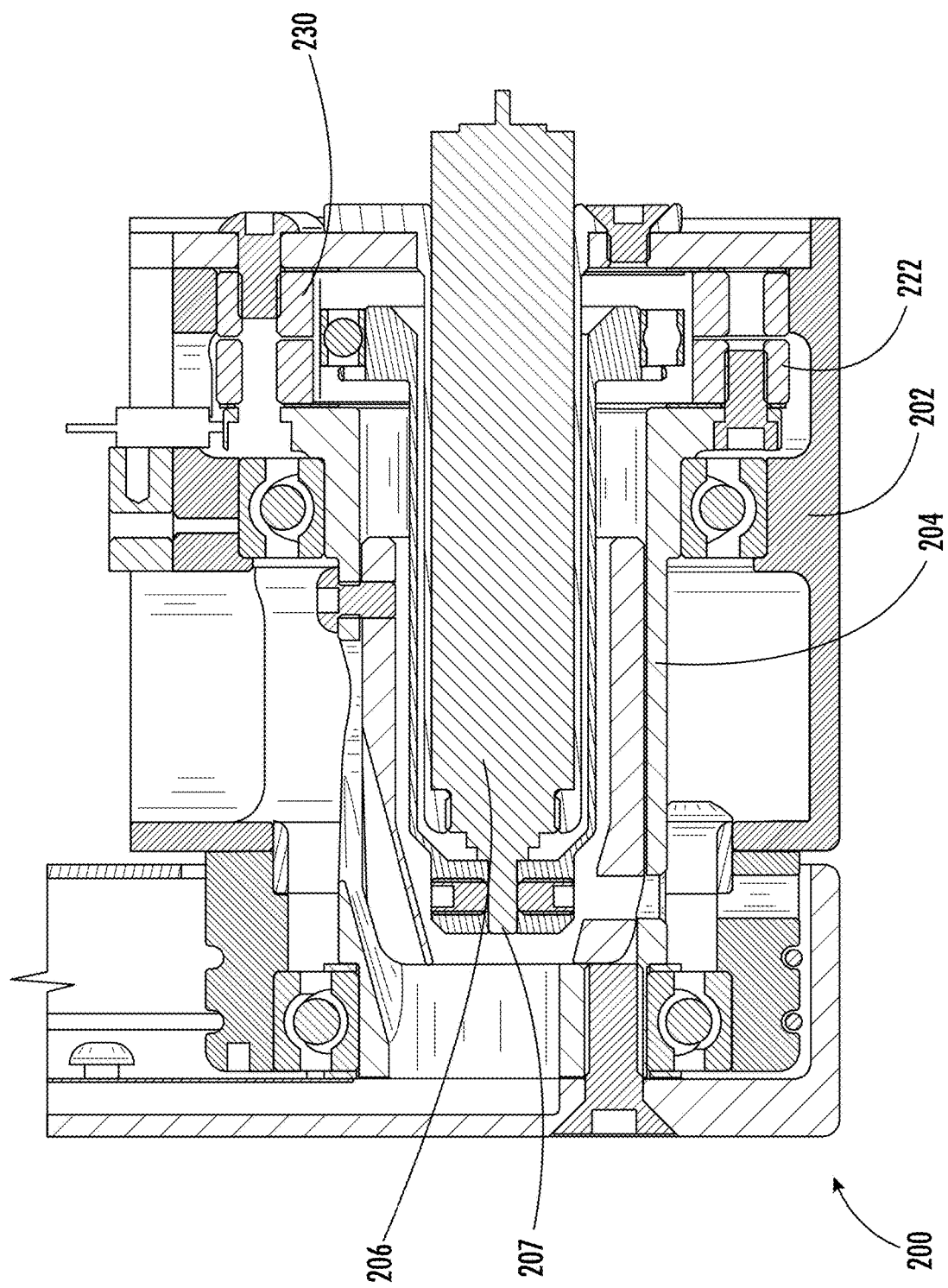

Overall, redesigning the harmonic drive wave generator shaft 112 and designing a flange motor mount has allowed the motor to be placed within the harmonic drive. Moreover, locating the bearings laterally as shown, allowed their dual use for the harmonic drive as well as main bearings of the actuator between the static component 102 and output component 104. As shown in FIGS. 2D and 2E, these render a compact assembly that is approximately as large as the harmonic drive and as long as the motor.

FIG. 2E illustrates a sectional view of a variation of the design of the present invention. With respect to FIG. 2E, the harmonic gearhead 200 includes motor 206. The motor 206 is placed centrally, within an opening defined by the static component 204 and the output component 202, shortening the overall assembly. The base of the actuator assembly is the static component 204 and the output is via output component 202. This is opposite of the embodiment described in FIG. 2D, where the base is static component 204 and the output is via output component 202. The motor 206 is mounted at its head 207 on a bell shaped, thin tubular flange, or motor mount, 208 that attaches to the static component 204. A harmonic drive with static splines 222 and dynamic circular splines 230 is used. Further with respect to FIG. 2E, the static spline 222 is mounted on the static component 204. The dynamic spline 230 is mounted on the output component 202. Therefore, motor 206 rotation causes the output component 202 to rotate relative to the static component 204, with a backlash-free, high transmission ratio. It should also be noted that output component 202 can be a single-piece or a multi-piece design. Static component 204 can also be a single-piece or a multi-piece design. This is determined, at least in part, by manufacturing needs and by the intended use of the particular harmonic gearhead 200.

Figure 3:
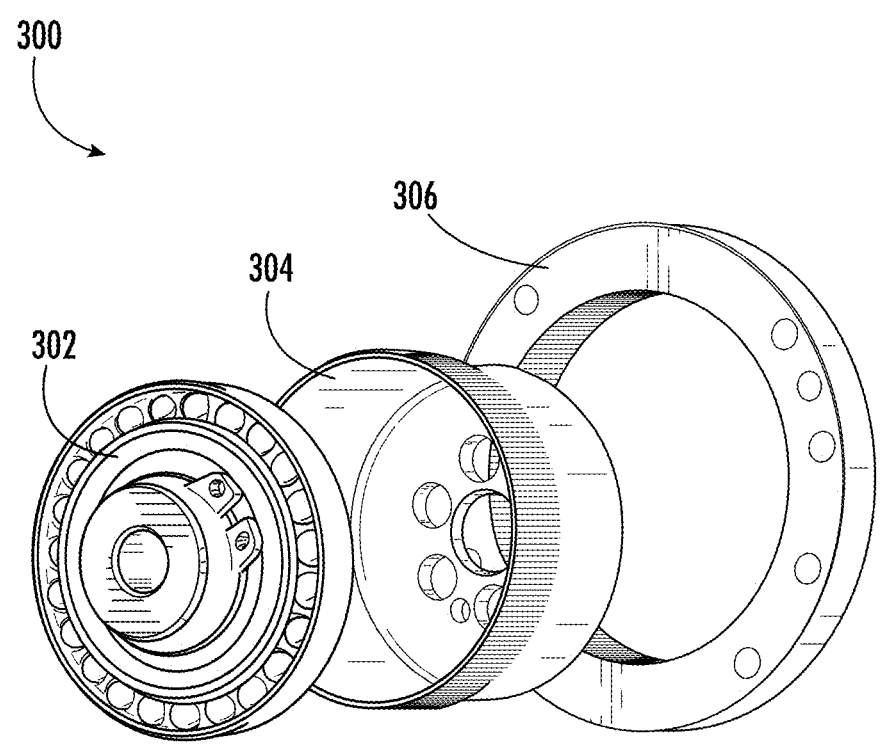
FIG. 3 illustrates a strain wave gear model.

Harmonic drives that include a bell shaped component exist. For example, the Strain Wave Gear model manufactured by Harmonic Drive LLC is shown in FIG. 3. This device 300 uses only three components: the wave generator 302, flexible spline 304, and circular spine 306. As shown, the flexible spline 304 has a bell shape. The wave generator shaft 302 of the present invention, as illustrated in FIGS. 2A-2E also has a bell shape, but is easily distinguishable from the design shown in FIG. 3. However, the difference is that the two components play different functions in the harmonic drive. Moreover, the arrangement of the Strain Wave Gear model illustrated in FIG. 3 does not allow the motor to be placed within, because, as is illustrated in FIG. 3, the central space is still taken by the wave generator 302. The wave generator and the motor mount of the present invention are novel as is their structure and placement to allow the motor to be disposed within the wave generator, and substantially enabling to render a compact actuator.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A device assembly comprising:
   a motor;
   a gearhead actuator assembly, wherein the gearhead actuator assembly includes a static component and an output component;
   a wave generator shaft, and,
   wherein the gearhead actuator assembly is configured for the motor to sit in a space defined by the static component and the output component, and wherein the wave generator shaft comprises a thin, tubular shape over the motor.

2. The device assembly of claim 1 wherein the wave generator shaft is bell-shaped.

3. The device assembly of claim 1 further comprising a bell-shaped motor mount.

4. The device assembly of claim 1 wherein the motor is cylindrically shaped.

5. The device assembly of claim 4 wherein the motor is an electrical motor.

6. The device assembly of claim 1 wherein bearings are located laterally to allow their dual use for the wave generator shaft as well as main bearings of the device via connection to the output component and the static component.

7. The device assembly of claim 1 wherein the motor comprises a gearhead.

8. The device assembly of claim 1 further comprising a harmonic drive with static and dynamic circular splines.

9. The device assembly of claim 1 further comprising a flexible spline.

10. The device assembly of claim 1 further comprising an output shaft.

11. A harmonic gearhead assembly comprising:
    a motor;
    a static component;
    an output component operatively coupled to the motor, such that an action of the motor generates a corresponding action of the output component;
    a wave generator shaft, and,
    wherein the static component and the output component are arranged to define a space in which the motor is disposed, and wherein the wave generator shaft comprises a thin, tubular shape over the motor.

12. The harmonic gearhead assembly of claim 11 further comprising a bell-shaped harmonic drive wave generator.

13. The harmonic gearhead assembly of claim 11 further comprising a bell-shaped motor mount.

14. The harmonic gearhead assembly of claim 11 wherein the motor is cylindrically shaped.

15. The harmonic gearhead assembly of claim 14 wherein the motor is an electrical motor.

16. The harmonic gearhead assembly of claim 11 wherein bearings are located laterally to allow their dual use for the wave generator shaft as well as main bearings of the device via connection to the output component and the static component.

17. The harmonic gearhead assembly of claim 11 wherein the motor comprises a gearhead.

18. The harmonic gearhead assembly of claim 11 further comprising a harmonic drive with static and dynamic circular splines, wherein the static circular splines are coupled to the static component and the dynamic circular splines are coupled to the output component.

19. The harmonic gearhead assembly of claim 11 further comprising a flexible spline.

20. The harmonic gearhead assembly of claim 11 wherein the motor is mounted from a head end of the motor.

* * * * *